United States Patent [19]

Hinze et al.

[11] Patent Number: 5,085,679
[45] Date of Patent: Feb. 4, 1992

[54] GLASS SPINNER MANUFACTURE

[75] Inventors: Jay W. Hinze; Richard D. Lawson, both of Newark, Ohio; Mott J. Blake, Huntington, W. Va.

[73] Assignee: Owens-Corning Fiberglas Corporation, Toledo, Ohio

[21] Appl. No.: 617,240

[22] Filed: Nov. 23, 1990

[51] Int. Cl.$^5$ .............................................. C03B 37/04
[52] U.S. Cl. ................................................ 65/1; 65/8; 65/15; 65/374.12; 72/208; 72/370; 419/28
[58] Field of Search ................... 65/1, 8, 15, 374.12; 72/208, 370; 419/28

[56] References Cited

U.S. PATENT DOCUMENTS

| | | | |
|---|---|---|---|
| 3,230,606 | 1/1966 | Saito et al. | 72/208 X |
| 3,591,362 | 7/1971 | Benjamin | 75/5 BA |
| 3,626,564 | 12/1971 | Danniel | 29/148 |
| 3,738,817 | 6/1973 | Benjamin | 29/182.5 |
| 3,782,794 | 1/1974 | Chmura et al. | 308/193 |
| 3,814,635 | 6/1974 | Cometto et al. | 148/11.5 |
| 3,867,751 | 2/1975 | Connell et al. | 29/148 |
| 4,059,879 | 11/1977 | Chmura et al. | 29/148 |
| 4,393,563 | 7/1983 | Smith | 29/149 |
| 4,402,767 | 9/1983 | Hinze et al. | 148/11.5 |
| 4,727,740 | 3/1988 | Yabuki et al. | 72/370 X |
| 4,877,435 | 10/1989 | Haeberle, Jr. et al. | 65/1 |

OTHER PUBLICATIONS

Frontiers of High Temperature Materials II article, "Forging and Fabrication of ODS Alloys", by E. Grundy, W. H. Patton, C. J. Precious & D. Pinder, pp. 100-115.
"Metalworking News", Sep. 1988, p. 27.
Schlosser Forge, p. 4.
Brochure of "Ajax Rolled Ring Co.", p. 6.
IncoMAP Status Report, J. S. Benjamin, pp. 20, 21, 23, 24.
Doncasters Blaenavon Ltd., "Forging Successful Partnerships on Land, Sea and Air", pp. 6-8.
Monograph from Proceedings of an International Conference on Oxide Dispersion Strengthened Superalloys by Mechanical Alloying, New York City, 5/18-21-81, entitled "Forging of Mechanically Alloyed Materials", by F. A. Thompson, p. 134.
"INCO Engineered Products Limited", p. 3.
"Rolling Rings of Power", by Foundry Focus, Autumn 1986, pp. 14-17.
"Metals Handbook", 8th Edition, 1970, vol. 5, pp. 105-112.
"Other Applications of Superalloys", by E. Grundy, Materials Science & Technology, Sep. 1987, vol. 3, p. 782 et seq.

*Primary Examiner*—Robert L. Lindsay
*Attorney, Agent, or Firm*—Patrick P. Pacella; Ted C. Gillespie; Robert F. Rywalski

[57] ABSTRACT

Oxide dispersion strengthened metals are ring rolled into a profiled member which can be employed as a spinner in the manufacture of fibrous glass. Sufficient hot working and annealing are provided to develop the desired coarse grain structure.

16 Claims, 2 Drawing Sheets

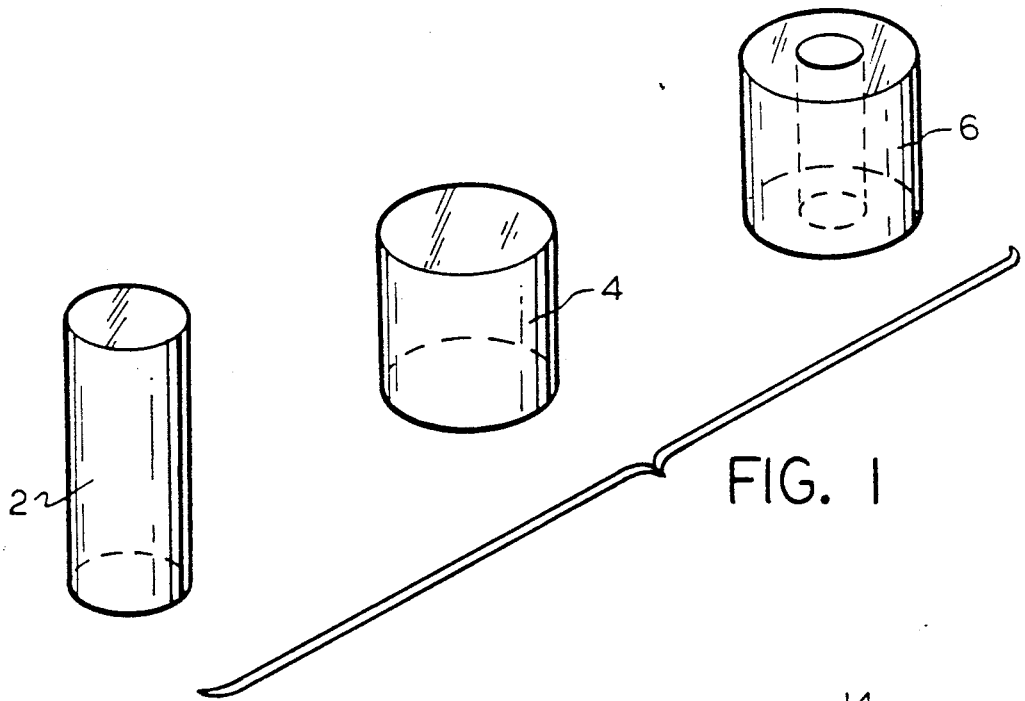
FIG. 1
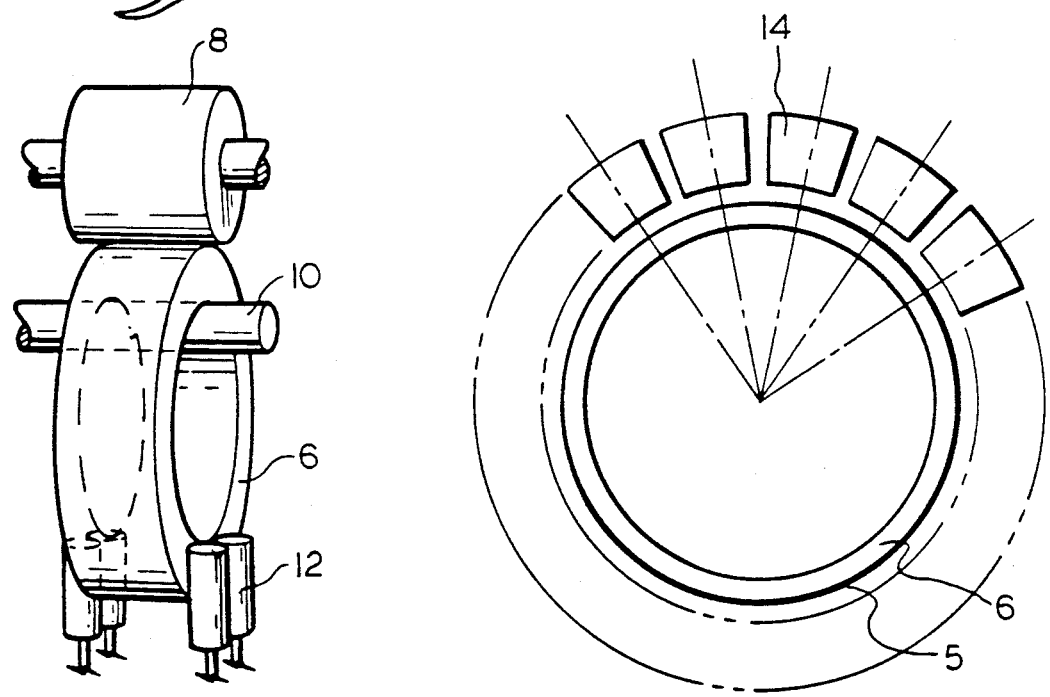
FIG. 2
FIG. 4
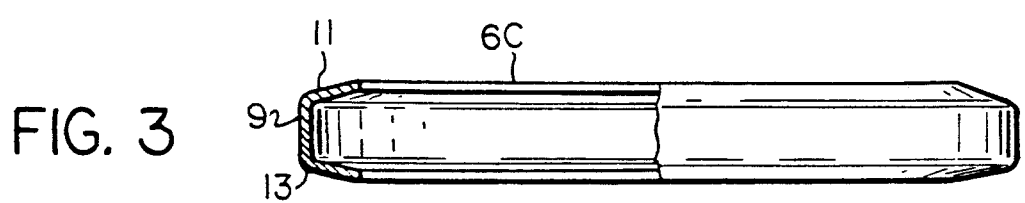
FIG. 3

GLASS SPINNER MANUFACTURE

TECHNICAL BACKGROUND

This invention relates to the manufacture of glass spinners. More specifically, the present invention relates to the manufacture of glass spinners which are formed by hot working of oxide dispersion strengthened metals.

BACKGROUND ART

In certain industrial applications there is a need for the use of alloys which possess high rupture strength and high oxidation resistance at high temperatures. Notable among such applications are those in the glass fiber industry where glass fiber filaments are produced from a molten material by passage through the foraminous, or apertured, walls of a ring-shaped member which is adapted for rotation at high speeds. This device is generally referred to as a spinner. The filaments are attenuated and emitted through the apertures of the wall of the rotating spinner due to the high centrifugal action. Such spinners are operated at elevated temperatures under high stress because of the high rotational speeds. Thus, there is a need for these spinners to be formed from an alloy which has high strength at elevated temperatures.

Current commercial spinner technology uses nickel or cobalt based alloys for the spinners and the spinners are formed by a casting operation. These alloys work well but there is still the need in the art for alloys with even higher, high temperature strength U.S. Pat. No. 4,402,767 discloses the use of oxide dispersion strengthened metals in the manufacture of glass fibers. Such alloys are a dispersion of small hard oxide particles, called dispersoids, in a metal matrix. This patent discloses the hot spin forming of a preformed sheet of an oxide dispersion strengthened metal. This patent further teaches important thermomechanical processing to provide a beneficial grain structure. Nonetheless, however, there is still a need in the art to provide a process for the formation of spinners from oxide dispersion strengthened metals which process eliminates the need for the separate formation of a sheet or plate of oxide dispersion strengthened metals. There is also a problem with the hot spin forming method because there is a substantial amount of wasted metal.

The present invention is directed at satisfying the above need in the art and solving the wasted metal problem by providing a process for forming high strength spinners made of oxide dispersion strengthened metals. An especially significant advantage of the process of this invention is that a net shape spinner is produced having very little waste.

DISCLOSURE OF THE INVENTION

In accordance with the present invention a hot working method is provided for forming a spinner. That is, a technique is disclosed for processing oxide dispersion strengthened metals below their incipient melting point to form an annular, or ring-shaped member, which is inwardly concave and which is easily adapted as a spinner for use in the formation of fibrous glass. The method comprises: ring rolling a hollow cylinder of an oxide dispersion strengthened alloy to decrease the wall thickness of said cylinder and increase both its inside and outside diameter; converting said ring rolled cylinder having such decreased wall thickness into a ring member having an axially rectilinear central annular portion and upper and lower flange portions extending inwardly therefrom, said rolling and converting being done below the recrystallization temperature of said alloy; heat treating said ring member; the ring rolling and converting being such that the wall thickness of the central annular portion compared to the initial wall thickness of said hollow cylinder is decreased in an amount sufficient for said heat treating to effect recrystallization of said alloy into a coarse grain structure.

Yet in accordance with another feature of the present invention, there is provided a process for producing a ring shaped member adaptable for use in glass making comprising: ring rolling a heavy walled hollow cylinder of an oxide dispersion strengthened alloy into a thinner walled ring, the wall of said thinner walled ring being rectangular in cross section; pressing said thinner walled ring into a ring whose wall is C-shaped in cross section; ring rolling said ring whose wall is C-shaped in cross section into a ring having a profiled cross section, said profiled cross section comprising an axially rectilinear annular central portion and upper and lower annular flanges respectively extending inwardly from said central portion; annealing said ring having said profiled cross section at a temperature and for a time sufficient to recrystallize the alloy to a coarser grain structure. Generally the coarse grain size will include grains in excess of 1 mm whereas the grain size is less than about 0.001 mm in the unrecrystalized state. The geometry of the configurations formed and the extent of the warm working will be such that the reduction in the wall thickness from the heavy walled cylinder to the ring having the profiled cross section will be effective for the recrystallization to the coarse grain structure during annealing. More quantitatively if the initial wall thickness of the heavy walled cylinder is considered $t_i$ and the final wall thickness of the axially rectilinear annular central portion is $t_f$ then $(t_i - t_f)/t_i \times 100$ is preferably at least about 75% and most desirably at least about 82 or 83%, especially if platinum or platinum based alloys are used.

In accordance with still another feature of the present invention an oxide dispersion strengthened metal powder is formed, for example, by extrusion, at an elevated temperature into a cylindrical billet. This billet is then converted into a precursor, annularly shaped member and that member, by progressive hot working, including ring-rolling is converted into an annular single piece profiled member of substantially increased diameter. The profiled member includes a centrally disposed axially rectilinear section and upper and lower flanges extending inwardly from the terminal portions of the central section. Since inadequate deformation of the alloy during processing can result in poor grain structure, maximization of the reduction in thickness of the initially formed precursor annular member is undertaken in order to help ensure that, upon final heat treatment, the grains recrystallize into a more desired grain structure.

BRIEF DESCRIPTION OF THE DRAWINGS

The drawings generally schematically illustrate various processing stages in a technique of carrying out the present invention.

In the drawings:

FIG. 1 schematically represent various transitory shapes of the oxide dispersion strengthened metal during the earliest processing stages of an embodiment of this invention;

FIG. 2 schematically illustrates a ring-rolling step used in the present invention;

FIG. 3 shows a final ring-shaped member in partial cross section formed in accordance with this invention;

FIG. 4 schematically illustrates another step in the process of the present invention;

DETAILED DESCRIPTION OF THE INVENTION INCLUDING THE BEST MODE OF CARRYING IT OUT

Figure 5A:
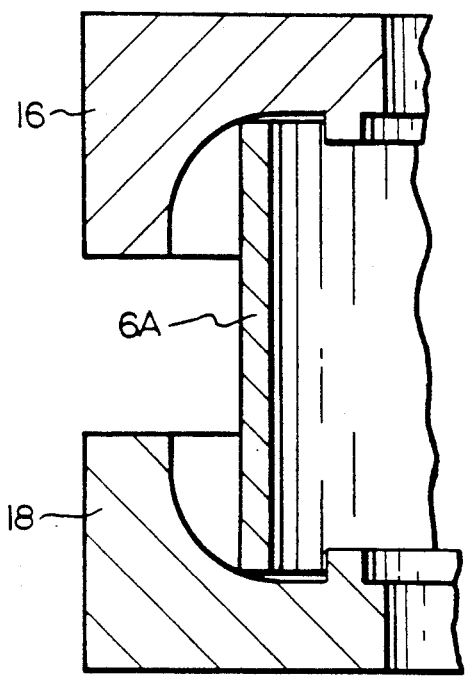
FIGS. 5A and 5B illustrate a preferred step in the present invention in which a ring-shaped member, in the form of a hollow right circular cylinder, is first formed and then converted to a ring-shaped member having an arcuate inwardly concave configuration in cross section.

The oxide dispersion strengthened metals contemplated for use in the present invention are well known in the art. These compositions include an oxide dispersoid dispersed in a metal matrix. The metal matrix may be any of a wide variety of compositions including nickel, cobalt, chromium, platinum, rhodium, and iron based materials. Preferred matrices are nickel—chromium based alloys as well as nickel—chromium—cobalt based alloys. The preferred dispersoid is yttria. Exemplary compositions and techniques for forming such oxide dispersion strengthened alloy powders are set forth in U.S. Pat. Nos. 3,591,362 and 3,738,817. The foregoing patents generally exemplify a technique, called mechanically alloying, for forming oxide dispersion strengthened alloys. Additionally suitable oxide dispersion strengthened metals will be found in U.S. Pat. Nos. 4,402,767, 3,814,635 and 4,877,435.

In one mode of practicing the present invention, powder is first formed, by extrusion, into a cylindrical billet. The cylinder is flattened and then pierced to form an annular precursor body. This annular body then has its diameter progressively increased, and its thickness decreased, to form a body of substantial diameter, for example, at least twelve inches and more commonly in excess of about thirty inches (ID). Ring-rolling is employed to produce a final annular structure which is inwardly concave and comprises a rectilinear central portion and upper and lower flanges, respectively, extending upwardly and inwardly (upper flange) and downwardly and inwardly (lower flange) from the central portion. The central portion can then be converted into a foraminous or apertured spinner wall for use in attenuating glass fibers by employing conventional drilling techniques. Such drilling techniques include laser drilling, electron beam drilling, electrical discharge machining and twist drilling.

The hot working process of the present invention is, of course, carried out below the incipient melting point and recrystallization temperature and above the minimum warm working temperature of the alloys. Upon completion, the final article is subjected to a heat treatment above the recrystallization temperature to form a suitable coarse grain structure. The coarse grain structure commonly produced is generally a pancake type structure with a high grain aspect ratio, e.g. greater than at least about 3:1. Representative warm working temperatures and heat treatment temperatures are set forth in U.S. Pat. Nos. 4,402,767 and 4,877,435.

Briefly, and as will be readily apparent from the foregoing discussion, the present invention contemplates the formation of a profiled ring member by a ring-rolling operation in which radially and outwardly directed forces are exerted on the interior surface of a ring member to not only increase its diameter but also to decrease the thickness of the member. Thus, the ring member is generally confined between an outer shaping die and a rotating forming mandrel circumferentially moving along the internal circumferential surface of the ring member. In this way an internal surface is formed which is axially rectilinear. That is, the internal surface of the ring member, in the axial direction, does not possess, for example, a groove or raceway such as that commonly formed in rolling bearing members. In other words, the internal surface of the central portion of the member formed in accordance with this invention will be essentially flat, or rectilinear, as opposed to a curvilinear central portion. The external surface of the central portion of the ring member formed in this invention likewise is axially rectilinear.

In the first step of an embodiment of this invention, the oxide dispersed metal powders are conveniently first formed into a billet of cylindrical shape which billet is then compressed to increase its diameter and decrease its height. Two especially suitable dispersion strengthened metals are yttria dispersed nickel-chromium alloys and yttria dispersed nickel-chromium-cobalt alloys. Representative suitable alloys of the latter type are set forth in U.S. Pat. No. 4,877,435 and a preferred alloy of the former type is described in the example which follows. This cylinder in turn is then formed into a seamless ring-shaped member. FIG. 1 schematically illustrates these various steps. The initial solid cylinder 2 of the material is formed by a conventional extruding operation in which the powders are first positioned in a can, and the can vacuum evacuated to clean the powder and then sealed. The powder is then forced at high temperatures such as, for example, at about 2000° F. into a die to form a solid cylinder 2. This extruded, essentially right circular cylindrical billet 2 is then, using conventional forging techniques, formed into a cylinder 4. An initial or precursor ring member 6, in the form of a hollow substantially right circular cylinder, is then formed by a conventional metal piercing operation from cylinder 4.

If the oxide dispersion strengthened metal is subjected to inadequate deformation, a poor and unacceptable grain structure will ultimately result. Consequently, and as will be quantified later, the relative thickness of the precursor annular member 6 and the final ring structure is important. The precursor ring should have adequate wall thickness to ensure that a maximized reduction in thickness will occur during the processing and thereby aid in the desired recrystallization to a more coarse grain structure as opposed to an undesired fine grain structure. In other words, the annular member 6 should be a heavy walled hollow cylinder, for example, one having a wall thickness of at least about one inch.

It should also be borne in mind that the processing temperature is important. If the oxide dispersion strengthened metal employed is too cold there is a severe danger of cracking. If the temperature is too hot there is a risk of substantial decrease in strength of the final object. Consequently, during the processing periodic reheating is required to maintain that temperature. In most operations which follow it will be found desirable to employ several passes, usually interspersed with some reheating, to effect a gradual diameter increase rather than effecting it in a single pass or operation.

The next step in the process is a ring-rolling step. In this step the precursor annular member 6 is processed so as to increase its diameter (ID and OD) and decrease its thickness. This operation is generally schematically illustrated in FIG. 2 and is effected by rotating ring 6 using a drive roller 8 and while moving forming roller, or mandrel, 10 along the internal circumference of ring 6 while simultaneously rotating roller 10 about its own axis. If desired, axial rollers 12 can be employed on the top and bottom surfaces of ring 6. In FIG. 2 rotating roller 10 has a smooth uniform cylindrical, or circular, surface as does roller 8. In this way both the internal and external surfaces of ring 6 are maintained in an axially rectilinear condition without the formation of an inward circumferential groove.

Periodically, the ring-rolling operation will be discontinued and the ring 6 will be positioned within a sizer. The function of the sizer is to maintain the ring member in roundness. This is schematically illustrated in FIG. 4 wherein the segmented dies 14 periodically move radially inwardly to put the ring 6 back into a uniformly round outside surface 5.

The ring-rolling of FIG. 2 is an operation in which ring 6 rotates about a horizontal axis. After the ring reaches a large diameter, e.g. an I.D. (internal diameter) of about 22 to 23 inches, further ring-rolling is desirably conducted substantially identical to that of FIG. 2 except that it is done with the ring 6 rotating on a table about the ring's vertical axis. During this further ring-rolling a vertically oscillating drop hammer, or anvil, is periodically employed to maintain the ring with a desired height. The vertical ring-rolling is then conducted for a sufficient period of time to form a ring which has a desired internal diameter. This ring member is then subjected to another sizing operation (not shown) which is somewhat the reverse of the sizer noted in FIG. 4. In this operation a conventional sizer is employed for purposes of expanding the diameter of a ring-shaped member. That is, the sizer employed has a series of segmented, generally pie-shaped pieces which are periodically expanded radially outwardly against the internal surface of the ring-shaped member so as to increase its diameter and maintain roundness.

Figure 5B:
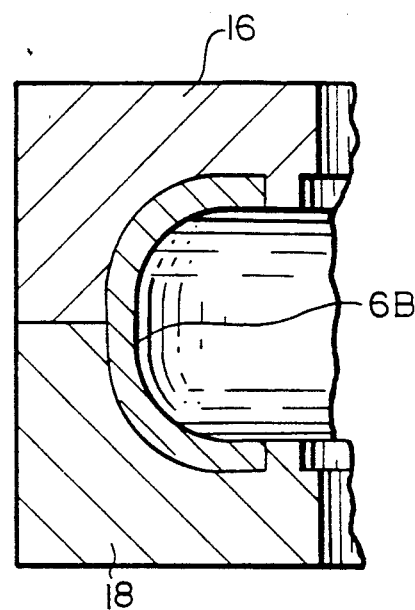

After these procedures an essentially hollow right circular cylindrical member, or sleeve, 6A of decreased thickness and increased ID now exists which is shown in FIG. 5A. The next step is to form sleeve 6A into an annular member having a C-shaped wall. FIGS. 5A and 5B represent the use of what may be viewed as an annular tool or annular compression dies to convert, by pressing, the essentially hollow right circular cylindrical ring 6A into a C-shaped annular member 6B as shown in FIG. 5B. This is a conventional operation in which an upper annular bonnet 16 and a lower annular bonnet 18 compressingly conform ring 6A therebetween so as to form the inwardly concave generally C-shaped ring 6B.

Figure 6:
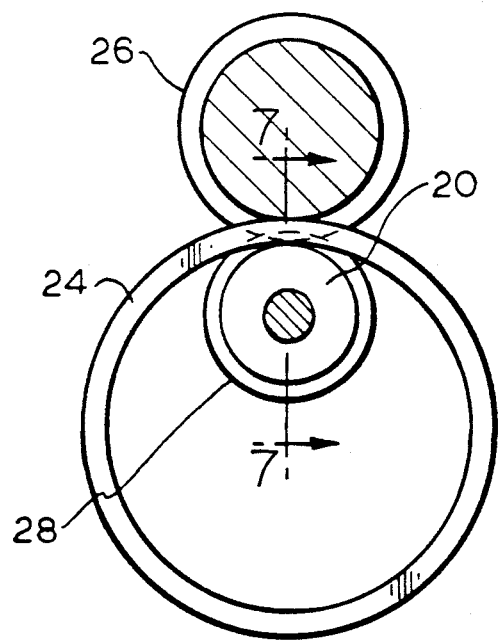
FIG. 6 schematically illustrate in plan view a final ring-rolling operation.
Figure 7:
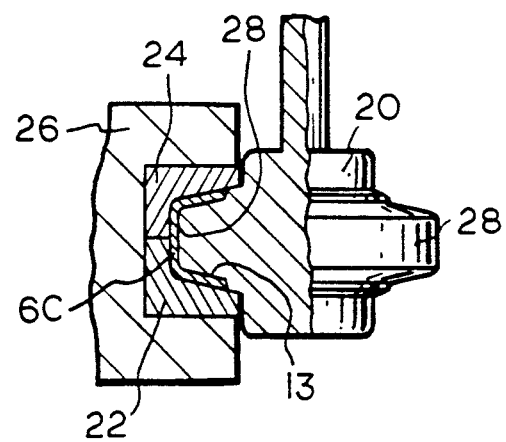
FIG. 7 is a section through line 7—7 of FIG. 6 and further illustrates the rolling operation to form the final ring member which is shown in FIG. 3.

In the next step C-shaped ring member 6B is then converted to a final profiled seamless structure 6C as generally illustrated in FIGS. 6 and 7. In the final profiled structure, ring member 6C includes an axially rectilinear central portion 9 (FIG. 3) and an upwardly and inwardly extending flange portion 11 extending from one end of the central portion 9 and a downwardly and inwardly extending flange portion 13 projecting from the other end. Referring to FIGS. 6 and 7, it will be noted that the original ring-shaped member 6B is converted to the final profiled structure 6C by employing a mandrel 20 which rotates about its own vertical axis while simultaneously rotating within the interior of ring member 6C. Ring member 6 is confined between a lower rotatable die member 22 and an upper rotatable die member 24. The die members 22 and 24 are rotatingly driven by a drive roll 26. Thus as mandrel 20 rotates, the oxide dispersion strengthened ring member 6B is converted to the shape of ring 6C by being progressively stressed outwardly between the external shaping surface 28 of mandrel 20 and the internal shaping surfaces of dies 22 and 24. Wall thicknesses of between about 0.3 to about 0.8 inch are typical.

The next step is to heat treat ring 6C to effect recrystallization. Heat treatments of between about 2350° F. to 2550° F. (but below the incipient melting point) for about one-half to about three hours are generally suitable. This results in a coarse grain structure.

In the last step the profiled ring 6C is machined using conventional machining operations and a plurality of apertures (not shown) are then drilled into the central portion 9 of the ring-shaped member to form a foraminous wall. The drilling may be done using conventional technology which is employed in the fabrication of glass forming spinners. The spinner is then used in a conventional manner to form glass fibers.

As previously indicated, if the deformation of the oxide dispersion strengthened metal is not adequate, a poor grain structure can result. Thus, maximization of the reduction in thickness of the ring to obtain desirable recrystallization of coarser, rather than finer, grains during annealing is important. If one considers the thickness of the initial precursor annular member 6 in FIG. 1 as being $t_i$, and the thickness of the central portion 9 of the ring member 6C as $t_f$, then the desired important deformation will be obtained when there is a deformation factor of at least about 75% and preferably at least about 83%. The deformation factor is calculated as $[(t_i - t_f)/t_i] (\times 100)$.

Unlike spin forming which starts with a preformed sheet or plate and then forms a dish-shaped member, the present ring-rolling process forms a much closer net shape article. Hence compared to such spin forming there is much less waste of metal. Compared to roll forming, where stock is bent and then welded to produce a cylinder, the present ring rolling invention produces a seamless article. This, of course, is quite beneficial since a weak seam is not formed.

While the above describes the present invention in sufficient detail to enable those skilled in the art to make and use same, nonetheless the following will further more specifically exemplify the present invention.

EXAMPLE

In the following, all processing steps were generally conducted at about 1800° F. to about 1850° F. The oxide dispersion strengthened metal which was employed was a yttria strengthened nickel-chromium alloy in which the weight ratio of nickel to chromium was approximately 70:30 and the yttria was about 0.6%. The alloy also contained a few hundredths percent of carbon, several tenths of a percent of Ti and Al and about 1% Fe. One such suitable alloy is available from Inco Alloys International as MA-758. The melting point of this material is on the order of about 2500° F.–2550° F.

Cylinder 2 was formed by a conventional extrusion technique at about 1950° F.–2000° F. with a diameter on the order of about 6.5 inches with a height of about 12 inches. The extrusion can was left in place after extrusion. During extrusion a ram speed of between 4 in./sec. to 9 in./sec. was used to obtain an extrusion ratio of at least 4:1. Additionally, in order to prevent buckling during later processing, the blank, or cylinder 2, should have a length to diameter ratio of less than about 2.7:1. Using conventional forging techniques, cylinder 4 was then formed having a height of about 7 inches and a diameter on the order of about 8 inches. Using a conventional metal piercing operation cylinder 4 was then converted into the heavy walled hollow cylinder of the oxide dispersion strengthened alloy with the hollow cylinder having a height of about 7 inches and a wall thickness of 2.58 inches. A steel sleeve was then inserted inside the cylinder. The outside diameter of the hollow cylinder 6 prior to ring rolling was on the order of about 8.4 inches and the internal diameter was about 3.25 inches. The height was maintained at approximately 7 inches.

Next, hollow cylinder 6 was ring rolled into a ring whose wall cross section was substantially rectangular and which had an internal diameter of about 12 inches at which time the internal sleeve was removed and the rolling continued to produce a ring with an internal diameter of about 22 inches. During this ring rolling operation cylinder 6 was reheated approximately fourteen times thus showing the gradual nature of the increase in diameter and decrease in the hollow cylinder's wall thickness. Such ring rolling was done with the mandrel rotating about a horizontal axis and the ring member likewise rotating about a horizontal axis. Further ring rolling was done with the ring and a mandrel (20) rotating about their respective vertical axes. This vertical ring rolling was employed in several stages to increase the internal diameter of the ring to about 33 inches. The height of the ring was maintained at approximately 7 inches. The outer protective can was removed. A sizer was then employed to increase the internal diameter of the ring to approximately 35 inches. The height was maintained at approximately 7 inches. This ring was essentially a hollow right circular cylinder with the wall being rectangular in cross section, i.e. axially rectilinear.

The hollow cylinder was then pressed into a ring-shaped member having an essentially C-shaped cross section using the techniques illustrated in FIGS. 5A and 5B. During the pressing and subsequent processing, the ring was protected by the application of Ceramguard material. This C-shaped member generally had a height of approximately 3 inches and a maximum internal diameter of approximately 37 inches.

The C-shaped ring member 6B was then converted to the final structure 6C in accordance with the ring rolling technique illustrated in FIGS. 6 and 7. In the final structure, ring member 6C had an axially rectilinear central portion with a height of about 2.25 inches. The internal diameter of rectilinear central portion 9 was approximately 39 inches and the wall thickness of central portion 9 was on the order of about 0.43 inches. The height of ring member 6C (top of the top flange to the bottom of the bottom flange) was approximately 3 inches.

The ring 6C was then annealed between about 2400° F. to about 2450° F. for 1–2 hours to effect recrystallization to a coarse grain structure. The grain size prior to the annealing heat treatment of ring 6C was on the order of about 0.001 mm whereas the grain size in the rectilinear central portion after the annealing heat treatment was much coarser and was typically at least 1 mm. It was observed that the coarse grain structure was not only circumferentially elongate but also axially elongate. Thus it will be seen that by employing a deformation factor of approximately 83% a coarse grain structure was obtained with the recrystallization heat treatment as opposed to an undesired fine grain structure.

Ring 6C is converted into a conventional spinner by simply drilling a plurality of apertures through the annular central panel portion 9. This is done using conventional drilling technology as previously indicated.

Samples were taken from the central portion 9 of ring-shaped members 6C generally manufactured as described above. Samples with the general grain structure noted above had stress rupture strengths of 7–8 KSI (2100° F., 100 hours). Even heterogeneous grain structures of smaller grain size had values of 4–6 KSI. An air cast alloy which is cobalt based but which is not oxide dispersion strengthened and which had received widespread commercial use for many years has a 100 hour rupture strength of about 2–3 KSI under those conditions. Such an alloy is generally exemplified by U.S. Pat. No. 3,933,484.

Ring-rolled hollow right circular cylinders of J alloy (platinum based alloy with rhodium) dispersion strengthened with yttria were manufactured and subjected to recrystalization heat treatments. Hot isostatic pressing was employed to produce the cylindrical preform which was then ring-rolled to form the above samples. The stress rupture life of a cylinder (0.139 inch wall thickness) subjected to a deformation of 75% was 155 hours (2100° F. and 3000 psi). Another similarly manufactured cylinder after 75% ring-roll deformation was cut apart and then subjected to additional deformation by flat rolling. The total deformation was 89% and, at a thickness of 0.060 inch, had a rupture life under the same conditions of 302 hours. Another cylinder ring-rolled to a deformation of 82% and having a wall thickness of 0.103 inch had stress rupture lives (2100° F., 3000 psi) of 131, 141 and 171 hours. The above noted commercially employed alloy has a stress rupture life of 30–60 hours at 2100° F. and 3000 psi.

While the above describes the present invention with sufficient particularity to enable those skilled in the art to make and use same, it will nonetheless be apparent that modifications are possible which pursuant to the patent statutes and laws do not depart from the spirit and scope of this invention.

We claim:

1. A process for forming a glass fiber-forming spinner comprising ring rolling a hollow cylinder of an oxide dispersion strengthened alloy to decrease the wall thickness of said cylinder and increase both its inside and outside diameter; converting said ring rolled cylinder into a ring member having an axially rectilinear central annular portion and upper and lower flange portions extending inwardly therefrom, said rolling and converting being done above the minimum warm working temperature and below the recrystallization temperature of said alloy; heat treating said ring member; said ring rolling and converting being such that the wall thickness of the central portion compared to the wall thickness of said hollow cylinder is decreased in an amount sufficient for recrystallization of said alloy into a coarse grain structure during said heat treating, the grain structure of said central portion being axially and circumferentially elongate, and forming a plurality of glass fiber-forming apertures in said central portion either before or after said heat treating.

2. A process for producing a ring shaped member adaptable for use in glass fiber making comprising: ring rolling a heavy walled hollow cylinder of an oxide dispersion strengthened alloy into a thinner walled ring, the wall of said thinner walled ring being rectangular in cross section; pressing said thinner walled ring into a ring whose wall is C-shaped in cross section; ring rolling said ring whose wall is C-shaped in cross section into a ring having a profiled cross section, said profiled cross section comprising an axially rectilinear annular central portion and upper and lower flanges respectively extending inwardly from said central portion; annealing said ring having said profiled cross section at a temperature for a time sufficient to recrystallize the alloy to a coarse grain structure which is axially and circumferentially elongate in said central panel, the reduction in wall thickness from the heavy walled spinner to the ring having said profiled cross section being effective for said recrystallization to said coarse grains during annealing and, either before or after said annealing, forming a plurality of glass fiber-forming apertures in said central portion.

3. The process of claim 2 wherein the initial wall thickness of said heavy walled cylinder is $t_i$ and wherein the final wall thickness of said axially rectilinear annular central portion is $t_f$ and wherein $[(t_i-t_f)/t_i] \times 100$ is at least about 75%.

4. A hot working method of forming a generally inwardly concave annular member which is adaptable to producing fibrous glass comprising extruding oxide dispersion strengthened metal powder into a solid cylindrical billet; forming said cylindrical billet into a precursor annular member; ring-rolling said precursor annular member a sufficient number of times to form an annular single piece member of increased diameter and decreased thickness which can be recrystallized to a coarse grain structure, said member having an axially rectilinear annular central portion and upper and lower flanges extending inwardly from said central portion, and recrystallizing said member into a coarse grain structure in which said grains in said central portion are axially and circumferentially elongate and circumferentially forming a plurality of fiber forming orifices in said central portion either before or after said recrystallizing.

5. The method of claim 4 wherein said extruding is done at an extrusion ratio of at least 4:1.

6. The method of claim 5 wherein the extrusion ram speed is between 4 inches/second and 9 inches/second.

7. The method of claim 4 wherein said precursor annular member formed from said cylinder has a thickness $t_i$ and the thickness of said axially rectilinear central portion is $t_f$ and wherein $[(t_i-t_f)/t_i] \times 100$ is at least about 75%.

8. In a method of making glass fibers comprising passing molten glass through the side wall of a rotating spinner, the improvement comprising forming the spinner in accordance with the process of claim 4.

9. In a method comprising: providing a glass fiber forming spinner at a fiber forming location and forming glass fibers with said spinner, the improvement wherein said providing step comprises: fabricating an oxide dispersion strengthened metal powder into an annular cylindrically shaped billet; ring-rolling said billet sufficiently to form a seamless annular member capable of being recrystallized to a coarse grain structure and having a central rectilinear portion and upper and lower flanges extending inwardly therefrom; forming a plurality of glass forming apertures in said central portion, said forming being done either before or after a recrystallizing heat treatment, and heat treating said member to recrystallize said member into a coarse grain structure and wherein said central portion contains grains which are axially and circumferentially elongate.

10. The method of claim 9 wherein said ring-rolling provides a deformation factor of at least about 83%.

11. A spinner for forming glass fibers said spinner having a plurality of fiber forming apertures and being formed from a ring-rolled oxide dispersion strengthened metal said spinner having a central rectilinear portion with recrystallized coarse grains which are axially and circumferentially elongate.

12. The spinner of claim 11 wherein said ring-rolling is sufficient to provide a deformation factor of at least about 75%.

13. The process of claim 1 wherein during ring rolling said oxide dispersion strengthened alloy is periodically reheated to maintain its temperature sufficiently high to stop cracking but not so high as to substantially decrease strength.

14. The process of claim 2 wherein during said ring rolling said oxide dispersion strengthened alloy is periodically reheated to maintain its temperature sufficiently high to stop cracking but not so high as to substantially decrease strength.

15. The method of claim 4 wherein during said ring rolling said oxide dispersion strengthened metal is periodically reheated to maintain its temperature sufficiently high to stop cracking but not so high as to substantially decrease strength.

16. The method of claim 9 wherein during said ring rolling said oxide dispersion strengthened metal is periodically reheated to maintain its temperature sufficiently high to stop cracking but not so high as to substantially decrease strength.

* * * * *